US009698849B2

(12) United States Patent
Juni

(10) Patent No.: US 9,698,849 B2
(45) Date of Patent: Jul. 4, 2017

(54) PORTABLE INFORMATION DEVICE CASE AND VIDEO PICTURE DISPLAY DEVICE CASE

(71) Applicant: NITTO DENKO CORPORATION, Ibaraki-shi, Osaka (JP)

(72) Inventor: Noriyuki Juni, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/030,807

(22) PCT Filed: Jun. 26, 2014

(86) PCT No.: PCT/JP2014/066996
§ 371 (c)(1),
(2) Date: Apr. 20, 2016

(87) PCT Pub. No.: WO2015/068424
PCT Pub. Date: May 14, 2015

(65) Prior Publication Data
US 2016/0261301 A1 Sep. 8, 2016

(30) Foreign Application Priority Data
Nov. 5, 2013 (JP) .................................. 2013-228907

(51) Int. Cl.
*H04M 1/00* (2006.01)
*H04B 1/3888* (2015.01)
(Continued)

(52) U.S. Cl.
CPC ............. *H04B 1/3888* (2013.01); *G02B 5/09* (2013.01); *G02B 27/0101* (2013.01);
(Continued)

(58) Field of Classification Search
CPC G02B 27/0101; G02B 27/0149; G02B 27/22; G02B 27/2235; G02B 27/2242;
(Continued)

(56) References Cited

U.S. PATENT DOCUMENTS

2010/0231860 A1  9/2010  Maekawa
2012/0287503 A1  11/2012  Mase
(Continued)

FOREIGN PATENT DOCUMENTS

JP   2011-191404 A   9/2011
JP   2012-137766 A   7/2012
(Continued)

OTHER PUBLICATIONS

Notification of Transmittal of Translation of the International Preliminary Report on Patentability (Form PCT/IB/338) issued in counterpart International Application No. PCT/JP2014/066996 mailed May 19, 2016 with Forms PCT/IB/373 and PCT/ISA/237. (11 pages).
(Continued)

*Primary Examiner* — Lee Nguyen
(74) *Attorney, Agent, or Firm* — Westerman, Hattori, Daniels & Adrian, LLP

(57) ABSTRACT

A portable information device case according to the present invention includes three plate-like members: a holder part for housing a portable information device (smartphone) therein, a cover part for covering the holder part, and an optical panel part including an image-forming optical element (micromirror array) fitted therein in light-transmissive fashion. When these members are combined together to have a predetermined shape, the optical panel part is held in an attitude inclined at a predetermined angle with respect to a display surface of the smartphone. Thus, the case allows selection with ease between a usage form in which an image
(Continued)

appearing on the display surface is projected as a spatial image and a storage form in which these members are folded and stacked so that the entire case is made compact. The portable information device case according to the present invention is easy to carry.

8 Claims, 12 Drawing Sheets

(51) Int. Cl.

| | | |
|---|---|---|
| G02B 5/09 | (2006.01) | |
| G02B 27/22 | (2006.01) | |
| G02B 27/01 | (2006.01) | |
| H04M 1/04 | (2006.01) | |
| H04B 1/3877 | (2015.01) | |
| H04B 1/10 | (2006.01) | |

(52) U.S. Cl.
CPC ..... *G02B 27/0149* (2013.01); *G02B 27/2292* (2013.01); *H04B 1/3877* (2013.01); *H04M 1/04* (2013.01); *G02B 2027/0154* (2013.01)

(58) Field of Classification Search
CPC .................. G02B 27/2292; G02B 5/09; G02B 2027/0154; H04B 1/3888; H04M 1/04
USPC ............................................... 455/566, 575.8
See application file for complete search history.

(56) References Cited

U.S. PATENT DOCUMENTS

| | | |
|---|---|---|
| 2014/0240228 A1 | 8/2014 | Juni |
| 2015/0124222 A1 | 5/2015 | Juni |

FOREIGN PATENT DOCUMENTS

| | | |
|---|---|---|
| JP | 2013-69272 A | 4/2013 |
| JP | 2013-76716 A | 4/2013 |
| JP | 2013-92720 A | 5/2013 |
| JP | 2013-160793 A | 8/2013 |
| WO | 2007/116639 A1 | 10/2007 |
| WO | 2013/114717 A1 | 8/2013 |
| WO | 2013/146241 A1 | 10/2013 |

OTHER PUBLICATIONS

International Search Report dated Jul. 29, 2014, issued in counterpart International Application No. PCT/JP2014/066996 (in English) (2 pages).

RELATED ART

PORTABLE INFORMATION DEVICE CASE AND VIDEO PICTURE DISPLAY DEVICE CASE

TECHNICAL FIELD

The present invention relates to a portable information device case capable of easily three-dimensionally displaying a two-dimensional video picture appearing on a portable information device such as a smartphone and a tablet, and a video picture display device case capable of three-dimensionally displaying a two-dimensional video picture such as a still picture and a moving picture appearing on a display in a manner floating up thereover.

BACKGROUND ART

A micromirror array has been developed as an image-forming optical element for image-forming three-dimensional or two-dimensional objects, video pictures and the like in space. The micromirror array includes a substrate (base) constituting an element surface of an optical element, and a multiplicity of unit optical elements formed in an array on the substrate and each having "two mirror surfaces orthogonal to each other" (a pair of adjacent light reflecting surfaces constituting a right-angled corner; that is, a corner reflector) (see PTL 1 and PTL 2).

The present applicant proposes a display device (video picture display device) including such a micromirror array and configured such that a display P displaying a video picture from which a projected spatial image I' is made is housed in an attitude inclined at a predetermined angle ($\alpha=30°$ to $90°$) with respect to an image-forming optical element (micromirror array M) in a case 20 that is like a dark box, as shown in FIG. 13, in Japanese Patent Application No. 2013-43074.

This display device uses a function (image-forming function) such that light incident on one surface (lower surface as seen in the figure) of the micromirror array M is reflected twice between a pair of light reflecting surfaces constituting each unit optical element (corner reflector) when passing through the array M, so that the light reflected twice (passing light) forms an image in a spatial position symmetrical with respect to the plane of an element surface Q on the other surface side (upper surface side as seen in the figure) of the array M. Thus, a mirror image reversed image of an image I, an object or the like placed on the one surface side of the micromirror array M is image-formed as an aberration-free real image (spatial image I') in space on the other surface side of the array M (space on the observer H side).

Also, as shown in FIGS. 14A and 14B, a micromirror array M1 (with reference to FIG. 14B) is used as the image-forming optical element in the display device (see PTL 3). In the micromirror array M1, two optical elements 21 and 21' (with reference to FIG. 14A) having a plurality of parallel linear grooves 21g and 21'g spaced at predetermined intervals and formed by dicing using a rotary blade in the front surfaces of flat-shaped transparent substrates (21 and 21'), respectively, are laid one on top of the other, with one of the optical elements 21 and 21' rotated horizontally through 90 degrees.

When the micromirror array M1 is viewed in the direction of the front and back surfaces of the substrates (in a vertical direction as seen in the figures), "corner reflectors" are formed respectively at the intersections (points of intersection of a lattice) of a first group of parallel grooves 21g and a second group of parallel grooves 21'g which are orthogonal to each other as seen in plan view. The corner reflectors are comprised of light-reflective vertical surfaces (wall surfaces) of the first group of parallel grooves, and light-reflective vertical surfaces (wall surfaces) of the second group of parallel grooves. In addition to the aforementioned example in which the substrates 21 and 21' are stacked together by bringing the front surfaces 21a and 21'a of the respective substrates 21 and 21' into abutment with each other, there are other cases in which the substrates 21 and 21' are stacked together by bringing the back surfaces 21b and 21'b of the respective substrates 21 and 21' into abutment with each other and in which the substrates 21 and 21' are stacked together by bringing the front surface 21a and the back surface 21'b thereof into abutment with each other and by bringing the back surface 21b and the front surface 21'a thereof into abutment with each other.

RELATED ART DOCUMENT

Patent Documents

PTL 1: WO 2007/116639
PTL 2: JP-A-2011-191404
PTL 3: JP-A-2013-69272

SUMMARY OF INVENTION

A case (enclosure) for use in the aforementioned display device is a relatively well-built case like a dark box capable of housing a display (display surface) therein and blocking ambient light because it is assumed that the case is used at the same position (stationary) without being transported. For this reason, there has been a problem such that the case is poor in portability and it is difficult to start to use the case easily and quickly.

It can be considered that the display device is utilized more simply and more easily if a smartphone, a tablet and the like which are the most familiar at present are used as the aforementioned display. It has therefore been desirable to develop a case which is portable with the smartphone, the tablet and the like in unitary fashion by fitting the smartphone, the tablet and the like and which allows the smartphone and the like to be used also as a display device.

In view of the foregoing, it is therefore an object of the present invention to provide a portable information device case and a video picture display device case which are capable of displaying a two-dimensional video picture appearing three-dimensional with a simple assembling operation and which are stored and carried compactly when not in use.

To accomplish the aforementioned object, a first aspect of the present invention is intended for a portable information device case comprising: a plate-like holder part having a recess for housing a portable information device therein so that a display surface of a display of the portable information device is visible; a cover part for covering the display surface of the display, with a gap created therebetween; and an optical panel part including an image-forming optical element fitted therein in light-transmissive fashion, wherein, when the holder part, the cover part and the optical panel part are combined together to have the shape of a polygonal tube, the image-forming optical element fitted in the optical panel part is held in an attitude inclined at a predetermined angle with respect to the display surface of the display in opposed relation thereto, so that a video picture on the display surface of the display transmitted through the image-forming optical element is image-formed outside the image-forming optical element in a manner which appears to float from a viewpoint of an observer.

To accomplish the aforementioned object, a second aspect of the present invention is intended for a video picture display device case comprising: an enclosure for housing a display therein; and an image-forming optical element, the enclosure including a top plate member provided with the image-forming optical element, and at least two side plate members each having an upper part supporting the top plate member, wherein, when the case is in a usage form in which the top plate member and the two side plate members are combined together to have a predetermined shape, the image-forming optical element is disposed in the upper surface of the top plate member of the enclosure, a display mounting surface that is an inner surface of the side plate members is provided under the image-forming optical element, and the display is held on the display mounting surface, with a display surface of the display held in an attitude inclined at a predetermined angle with respect to the lower surface of the image-forming optical element, so that, a video picture on the display surface of the display transmitted through the image-forming optical element is image-formed over the image-forming optical element in a manner floating up.

The present inventor has made studies to solve the aforementioned problem. As a result, the present inventor has found that a video picture display device that displays a two-dimensional video picture rich in a sense of depth and appearing three-dimensional is significantly improved in convenience, when the case that houses the display therein is configured to allow a rapid change between the form (usage form) in which the appropriate members are combined and assembled so that the display is held in an inclined attitude under the image-forming optical element and the form (storage form) in which these members are stacked (folded) together so that, the entire case is stored compactly.

As described above, the portable information device case according to the first aspect of the present invention includes at least three plate-like members: the holder part for housing the portable information device (display) therein, the cover part for covering the holder part, and the optical panel part including the image-forming optical element. When these members are combined together so that the entire case has the shape of the polygonal tube, the image-forming optical element fitted in the optical panel part is held in the attitude inclined at the predetermined angle with respect to the display surface of the display in opposed relation thereto. Thus, a video picture appearing on the display is image-formed outside the image-forming optical element in a manner which appears to float from a viewpoint of an observer by a simple assembling (combining) operation.

In particular, the portable information device case wherein selection is allowed between a first form in which a hinge connection is made between the holder part and the cover part and a hinge connection is made between the optical panel part and one of the holder part and the cover part, so that the holder part, the cover part and the optical panel part are assembled into the shape of the polygonal tube and a second form in which the holder part, the cover part and the optical panel part are folded by closing the hinge connections, so that the optical panel part is housed between the holder part and the cover part, allows anyone to easily and quickly perform the assembling operation when in use and the storage operation of the optical panel part when not in use.

Further, the portable information device case is structured so that the optical panel part is housed between the holder part and the cover part (that is, in the case) as described above during storage. This achieves compact storage and a high degree of portability (carryability). The portable information device case has another advantage in that the optical panel part (image-forming optical element) is protected and resistant to scratches due to friction when carried because the optical panel part is housed in the case.

In particular, in the portable information device case wherein the inclination angle of the image-forming optical element with respect to the display surface of the display (i.e., the interior angle between the holder part and the optical panel part when the case is in the form of the polygonal tube) is not less than 30 degrees and less than 90 degrees when the case is in the first form, a spatial image (two-dimensional video picture appearing three-dimensional) displayed outside the image-forming optical element is displayed as a three-dimensional video picture with a stronger sense of floating.

When the recess of the holder part is a recess for housing a smartphone therein, the portable information device case is suitably used as a "smartphone case" for housing and carrying a smartphone.

When the recess of the holder part is a recess for housing a slate-type or tablet-type information terminal therein, the portable information device case is suitably used as a "tablet case" for housing and carrying a portable information terminal.

Next, the video picture display device case according to the second aspect of the present invention includes: the enclosure for housing the display therein; and the image-forming optical element. The enclosure includes the top plate member provided with the image-forming optical element, and the at least two side plate members each having the upper part supporting the top plate member. When the case is in the usage form in which the top plate member and the two side plate members are combined together to have the predetermined shape, the image-forming optical element is disposed in the top plate member positioned at the upper surface of the enclosure, the display mounting surface that is the inner surface of the side plate members is provided under the image-forming optical element, and the display is held on the display mounting surface, with the display surface of the display held in the attitude inclined at the predetermined angle with respect to the lower surface of the image-forming optical element. Thus, as in the portable information device case, a video picture appearing on the display is image-formed over the image-forming optical element, in a manner floating up by a simple assembling operation.

In particular, the video picture display device case wherein selection is allowed between the usage form in which a hinge connection is made between the top plate member and at least one of the side plate members, so that the top plate member and the two side plate members are combined together to be able to project a video picture and a storage form in which these members are individually separated or folded and stacked, so that the shape of the entire video picture display device case is made compact, allows anyone to easily and quickly perform the assembling operation when in use and the storage operation when not in use. Also, the video picture display device case according to the present invention is improved in portability (carryability). When in use, the video picture display device case allows the display to be quickly placed in the predetermined position by a simple assembling operation, thereby immediately starting the display (projection of the spatial image).

In particular, in the video picture display device case according to the second aspect wherein the inclination angle of the display surface of the display with respect to the lower surface of the image-forming optical element (i.e., the angle formed by the top plate member including the image-forming optical element and the side surface member having the display mounting surface when the case is in the assembled form) is not less than 30 degrees and less than 90 degrees, a spatial image (two-dimensional video picture appearing three-dimensional) displayed over the image-forming optical element is displayed as a three-dimensional video picture with a stronger sense of floating.

BRIEF DESCRIPTION OF DRAWINGS

FIG. 8A shows the shape of an enclosure in the usage form, and FIG. 8B shows the shape of the enclosure in a storage form.

FIGS. 10A and 10B show folding types, and FIGS. 10C and 10D show assembling types.

FIG. 11A shows the shape of an enclosure in the usage form, and FIG. 11B shows the shape of the enclosure in the storage form.

DESCRIPTION OF EMBODIMENTS

Next, embodiments according to the present invention will now be described in detail with reference to the drawings. It should be noted that the present invention is not limited to the embodiments. The thicknesses of an image I and a spatial image I' in the figures are shown in exaggeration although the images I and I' have no thicknesses in reality. Light emitted from a display and transmitted (light beams) is indicated by dot-dash lines.

Figure 1A:
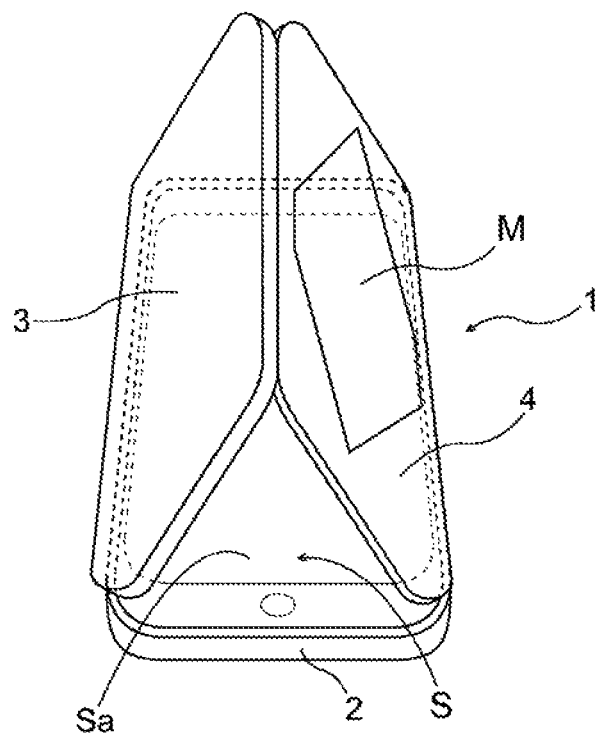
FIG. 1A is an external perspective view of a portable information device case (smartphone case) when in use according to a first embodiment of the present invention.
Figure 1B:
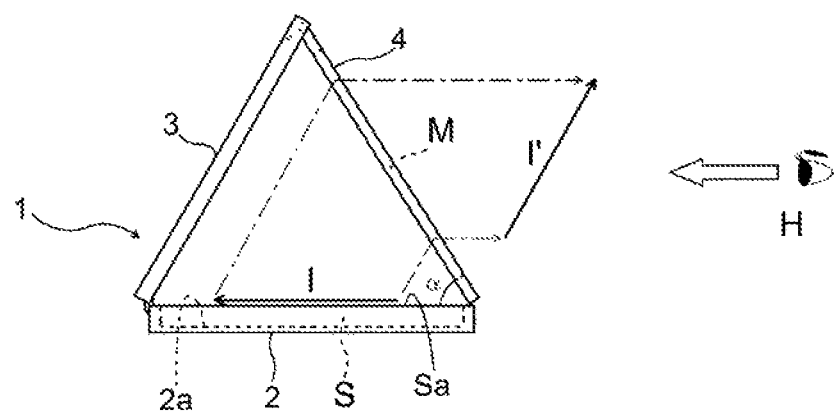
FIG. 1B is a side view thereof.

As shown in FIG. 1A, a portable information device case (smartphone case) 1 in a first embodiment according to a first aspect of the present invention includes three generally plate-like members: a holder part 2 for housing a display (smartphone S) therein; a cover part 3 for covering an opening (recess 2a) in the upper surface of the holder part 2; and an optical panel part 4 including an image-forming optical element (micromirror array M). As shown in FIG. 1B, the three generally plate-like members are combined together so as to have a tubular shape (the shape of a polygonal tube; the shape of a triangular tube in this example) having polygonal peripheral side surfaces, thereby constituting the portable information device case 1. When the three members are combined (assembled) together, the optical panel part 4 (micromirror array M) is held in an attitude inclined at a predetermined angle α with respect to a display surface Sa of the smartphone S, so that a video picture appearing on the display surface Sa is image-formed outside the micromirror array M of the case 1 in a manner floating from a viewpoint of an observer H, as shown in FIG. 1B. This is a characteristic of the smartphone case 1 according to the first embodiment.

The smartphone case 1 will be described in detail. When folded to house the optical panel part 4 therein, the case 1 is of a flat shape having a thickness as a whole, as shown in side view of FIG. 2A and in plan view of FIG. 2B.

Figure 2A:
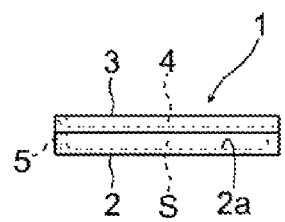
FIG. 2A is a side view of the portable information device case in a closed position according to the first embodiment.
Figure 2B:
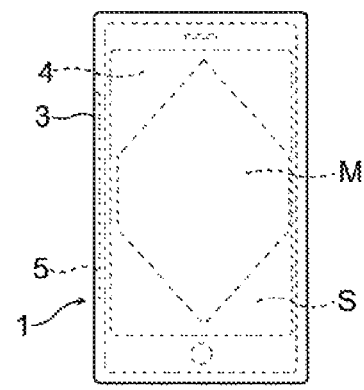
FIG. 2B is a top plan view thereof.
Figure 2C:
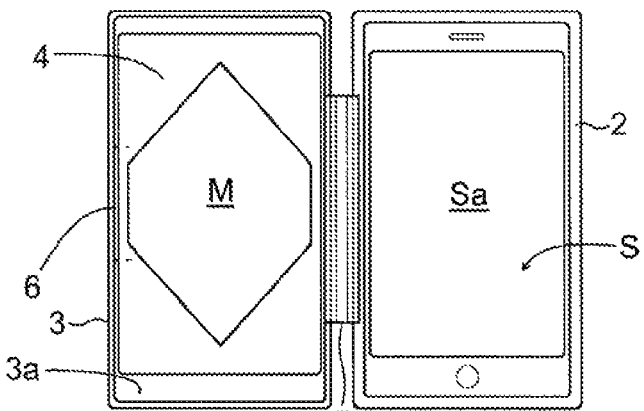
FIG. 2C shows the portable information device case according to the first embodiment, with a cover part in an open position (an optical panel part in a folded position)

As shown in FIG. 2C, the holder part 2 of the smartphone case 1 is of a generally rectangular shape along the outside shape of the smartphone S stored inside as seen in plan view, and is of a flat shape having a thickness as a whole (with reference to FIG. 2A). The large recess 2a opening upwardly is formed in substantially the entire upper surface of the holder part 2. The smartphone S is housed in the recess 2a. An engagement structure and the like for holding and fixing the smartphone S are not shown. A notch for connection of a charging terminal and the like may be provided in a side wall of the recess in a position opposed to a connecting terminal portion of the smartphone S.

Figure 2D:
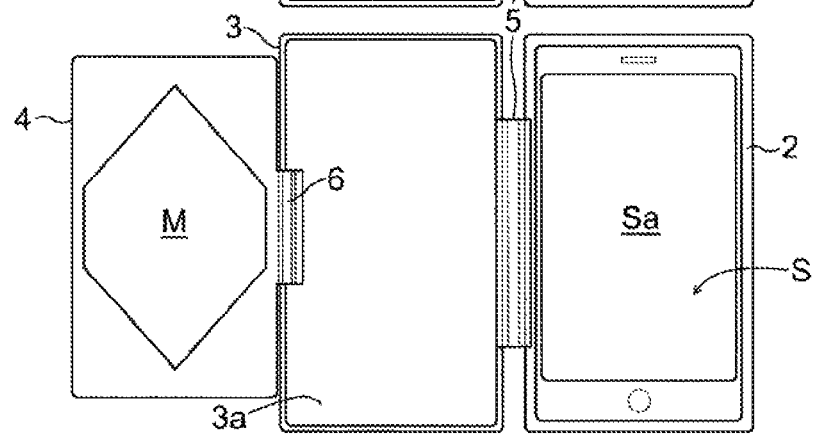
FIG. 2D shows the portable information device case according to the first embodiment, with the optical panel part in the cover part in an unfolded position.

As shown in FIG. 2D, the cover part 3 is of a generally rectangular shape along the outside shape of the smartphone S, as seen in plan view, in a manner similar to that of the holder part 2, and is of a thinner plate-like shape resembling that of the holder part 2 as a whole (with reference to FIG. 2A). A recess 3a in the shape of a shallow dish and opening toward the holder part 2 is formed in substantially the entire inner surface of the cover part. 3 (on the holder part 2 side), so that, the optical panel part 4 is housed in the recess 3a.

As shown in FIGS. 2C and 2D, a flexible sheet-like member (connecting member 5) made of resin, leather and the like is used for hinge connection between the cover part 3 and the holder part 2. The cover part 3 is pivotable about the connecting member 5 with respect to the holder part 2 (that is, openable and closable as a lid member for the case).

As shown in FIGS. 2C and 2D, the optical panel part 4 of the smartphone case 1 is formed by sandwiching and fixing the image-forming optical element (micromirror array M) in light-transmissive fashion between two plate-like members each having a large, generally hexagonal opening.

A flexible sheet-like member (connecting member 6) made of resin, leather and the like and similar to the connecting member 5 is formed or attached in the shape of a tongue on or to an edge of the optical panel part 4 closer to the cover part 3. The optical panel part 4 is hingedly connected to the cover part 3 via the connecting member 6. With such a configuration, the optical panel part 4 is pivotable about the connecting member 6 with respect to the cover part 3 (that is, extendable out of and retractable into the recess 3a of the cover part 3). This allows the optical panel part 4 to be stored in the recess 3a of the cover part 3.

Figure 14A:
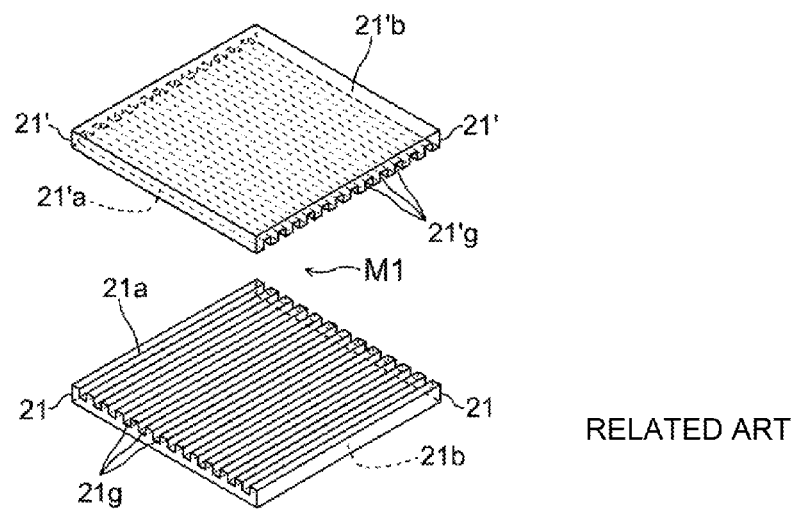
FIG. 14A is a view of a configuration of a micromirror array for use in a video picture display device and shows single optical element substrates before assembly.

A specific example of the micromirror array M for use in the optical panel part 4 includes a micromirror array (M1 with reference to FIG. 14A) including two optical elements (substrates) having a plurality of parallel linear grooves spaced at predetermined intervals and formed by dicing using a rotary blade in the front surfaces of transparent substrates, the two optical elements being laid one on top of the other, with one of the optical elements rotated horizontally 90 degrees relative to the other, as mentioned above.

Examples of the shape of the opening in the optical panel part 4 may include, in addition to the hexagonal shape as shown in FIGS. 2C and 2D, other polygonal shapes such as tetragonal and pentagonal shapes, and simple circular and elliptical shapes. The size (inner edge shape) of the opening may be any shape that is close to the planar shape of the micromirror array M.

The type of the smartphone S housed in the holder part 2 is not particularly limited. However, a slate-type {bar} phone having no lid and a slider phone (rather than a flip phone) are preferably used, and a smartphone having a display surface as large (wide) as possible is preferably used. Further, a tablet-type portable information terminal having a wider display surface may be used in place of the smartphone, so that the case serves as a "tablet case".

Next, a method of transforming the smartphone case 1 from a storage form (FIGS. 2A and 2B) to a usage form (FIGS. 1A and 1B) will be described.

For the transformation from the storage form (FIG. 2B), the holder part 2 in a closed position (with the optical panel part 4 stored therein) is initially opened about the hinge connection part (connecting member 5), so that the smartphone S (display surface Sa) and the optical panel part 4 are exposed, as shown in FIG. 2C.

Next, the optical panel part 4 is extended out of the recess 3a in the cover part 3 about the similar hinge connection part (connecting member 6), so that the members are unfolded, as shown in FIG. 2D. Then, the optical panel part 4 and the cover part 3 are raised about the hinge connection parts, with the holder part 2 used as a base. The three parts 2, 3 and 4 are combined so as to have the shape of a triangular tube, as shown in FIG. 1B. This provides a position (usage form) which allows the projection of a video picture appearing on the display surface Sa of the smartphone S.

Although not particularly shown, a fixing member for holding and fixing (temporarily fixing) the optical panel part 4 at a predetermined angle α (approximately 60 degrees in this example) with respect to the holder part 2 (the display surface Sa of the smartphone S) may be disposed between the holder part 2 and the optical panel part 4.

The procedure for the aforementioned assembly is reversed for returning the smartphone case 1 into the storage form after use. Specifically, the temporary fixing, if any, between the holder part 2 and the optical panel part 4 is released. Then, the members are pivoted using the hinge connection parts (connecting members 5 and 6), so that the optical panel part 4 is stored in the recess 3a of the cover part 3. Subsequently, the cover part 3 is closed (FIG. 2D→FIG. 2C→FIG. 2B). Thus, easy storage is achieved.

An example in which the smartphone case 1 is placed on a flat surface, such as on a desk, is illustrated in FIG. 1B described above. However, the portable information device case (smartphone case 1) according to the present invention may take a variety of usage forms in accordance with usage scenes (backgrounds and the like) by taking advantage of its properties of being excellent in portability, carryability and the like.

Figure 3A:
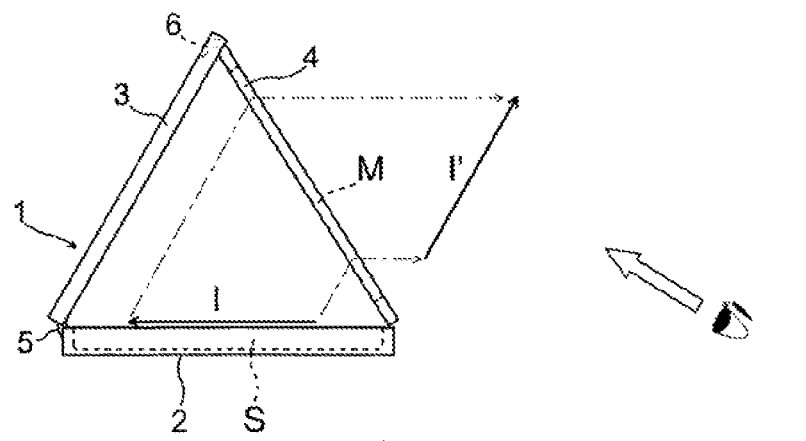
FIGS. 3A to 3C show examples of how to use the portable information device case according to the first embodiment and show examples of the image formation of spatial images projected, with a display surface of a display (smartphone) positioned facing upwards.
Figure 3B:
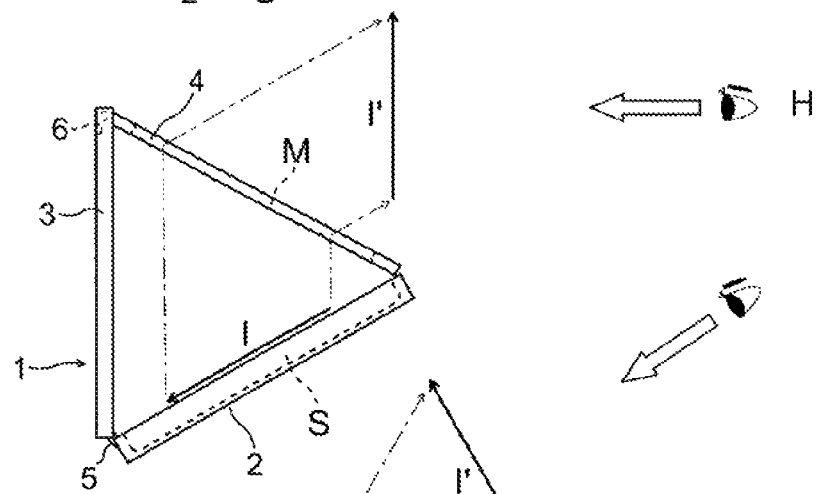
Figure 3C:
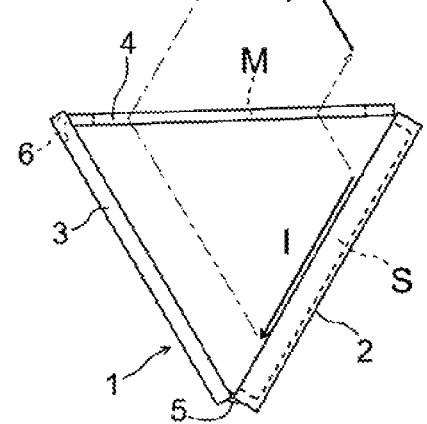

For example, as shown in FIGS. 3A to 3C, the observer H may hold the smartphone case 1 in his/her hand and use the smartphone case 1 while changing the position of the smartphone case 1 at his/her pleasure in corresponding relation to his/her eyepoint. Examples of the position of the smartphone case 1 include: a position in which the observer H looks up at a projected spatial image I' from below as shown in FIG. 3A (for example, a starry sky, a cloud and an aircraft); a position in which the observer H looks at a spatial image I' substantially horizontally as shown in FIG. 3B (for example, a person, an animal, a building and a landscape); and a position in which the observer H looks down at a spatial Image I' from above as shown in FIG. 3C (for example, a water surface, a map and a small animal).

Figure 4A:
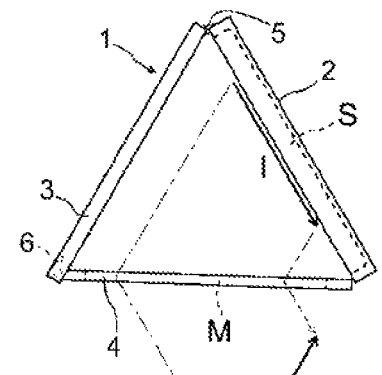
FIG. 4A to 4C show examples of how to use the portable information device case according to the first embodiment and show examples of the image formation of spatial images projected, with the display surface of the display (smartphone) positioned facing downwards.
Figure 4B:
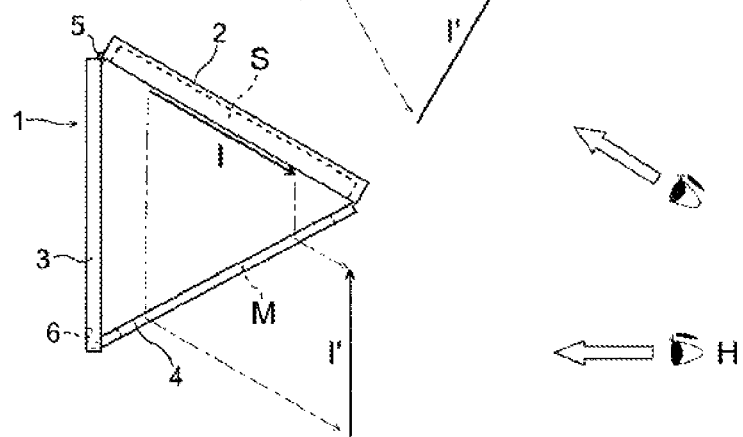
Figure 4C:
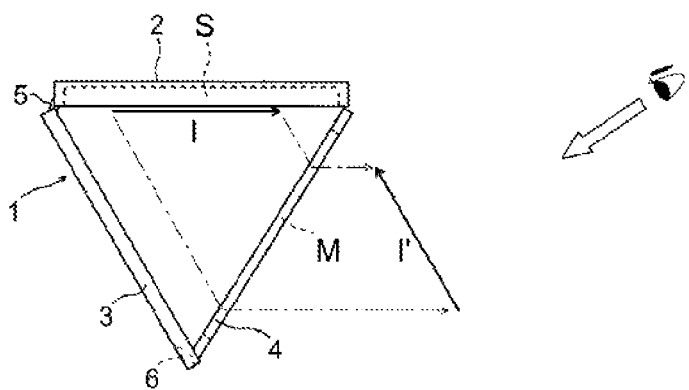

When the observer H uses the smartphone S while holding the smartphone S positioned downward as shown in FIGS. 4A to 4C, the observer H may similarly set the position of the smartphone case 1 at his/her pleasure in corresponding relation to his/her eyepoint. Likewise, examples of the position of the smartphone case 1 include: a position in which the observer H looks up at a projected spatial image I' from below as shown in FIG. 4A; a position in which the observer H looks at a spatial image I' substantially horizontally as shown in FIG. 4B; and a position in which the observer H looks down at a spatial image I' from above as shown in FIG. 4C, When the observer H uses the smartphone S positioned downward (FIGS. 4A to 4C), an image I appearing on the display surface Sa is opposite in orientation (upside down) from that of FIGS. 3A to 3C.

Figure 5:
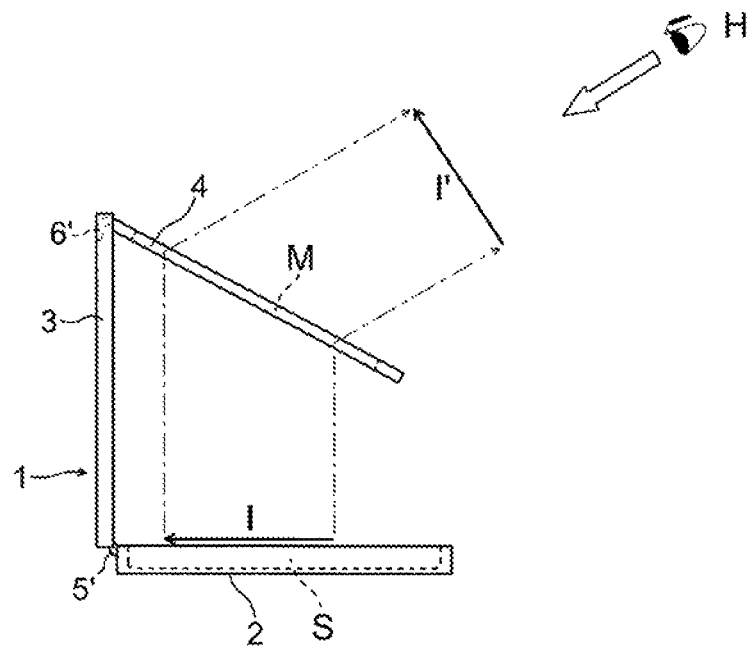
FIG. 5 is a side view of another example of the portable information device case according to the first embodiment.
Figure 6:
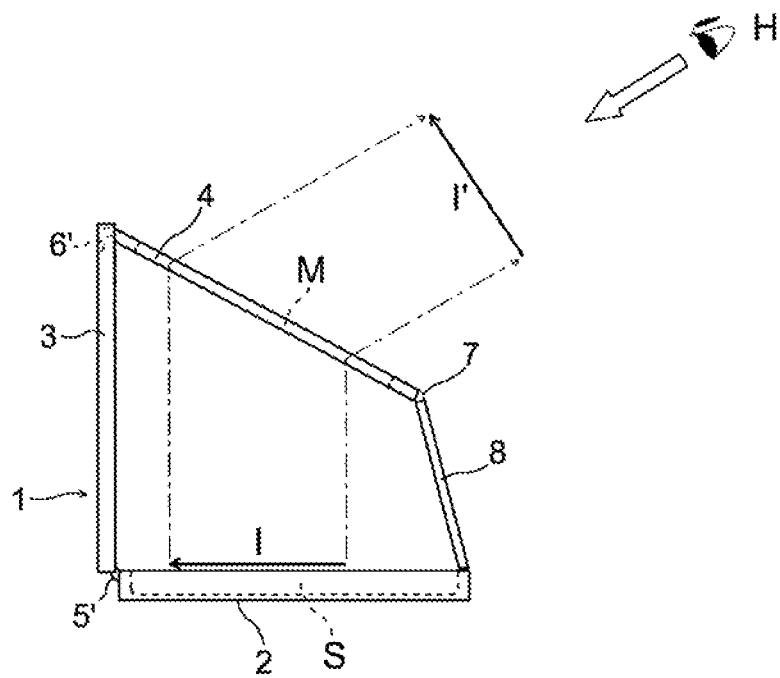
FIG. 6 is a side view of still another example of the portable information device case according to the first embodiment.

The configuration (shape) of the smartphone case 1 according to the present invention is not limited to the shape of a generally triangular tube as seen in side view in the first embodiment, but may be the shape of tubes (polygonal tubes) having other polygonal peripheral side surfaces. For example, when the connecting members 5 and 6 for connecting the parts 2, 3 and 4 are connecting member 5' and 6' fixable at any angle, the smartphone case 1 may be fixed in such a shape that the peripheral side surfaces of a triangular tube are partially opened (with reference to FIG. 5). Also, the smartphone case 1 may be in the shape of a tetragonal tube (an additional connecting member 7 and an additional panel part 8) as shown in FIG. 6 or in a shape having more peripheral side surfaces. The combination of the members of the smartphone case 1 and the shape of the smartphone case 1 may be freely designed. However, the use of the shape (tube) having too many peripheral side surfaces causes the increased complexity of the configuration, resulting in the increase in the number of parts and accordingly in manufacturing costs.

Next, a video picture display device case in a second embodiment according to a second aspect of the present invention will be described. In the second embodiment, a flat panel display of a liquid crystal display device (LCD) and the like is used as a display P. In the relevant figures, the reference character 9A designates an adhesive tape for fixing the position of the display P, and 9B designates a transparent acrylic board for protecting the image-forming optical element (micromirror array M).

Figure 7:
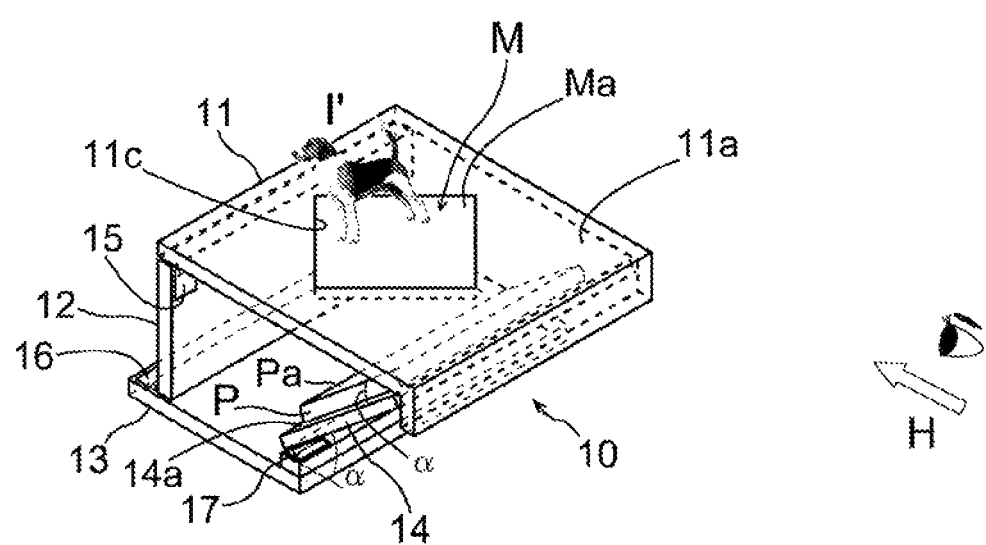
FIG. 7 is a perspective view of a configuration of a video picture display device case in a usage form according to a second embodiment.

As shown in FIG. 7, the video picture display device case according to the second embodiment includes an enclosure 10 comprised of members (in this example, four members: a top plate member 11, a first side plate member 12, a bottom plate member 13, and a second side plate member 14). With these members assembled in a predetermined shape (usage form), the display P is placed under a panel-shaped micromirror array image-forming optical element (hereinafter referred to as a "micromirror array M" or simply as an "array M") fitted in the top plate member 11, so that a video picture (image I) appearing on a display surface Pa of the display P is image-formed as a spatial image I' standing up obliquely in space over the array M in a manner floating up by utilizing the reflection (image-forming function) of light from a large number of micromirrors (corner reflectors) provided in the array M.

Figure 8A:
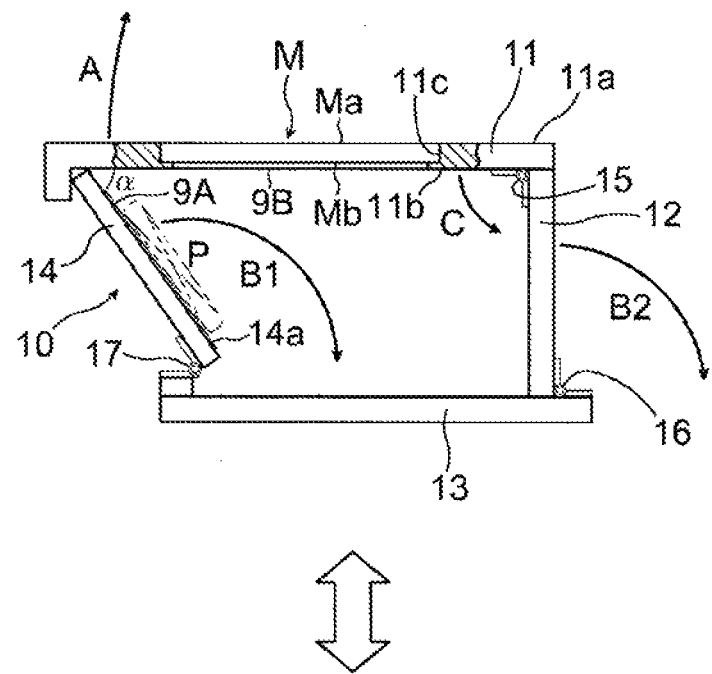
FIGS. 8A and 8B are side views illustrating the manner of transformation of the video picture display device case according to the second embodiment of the present invention.
Figure 8B:
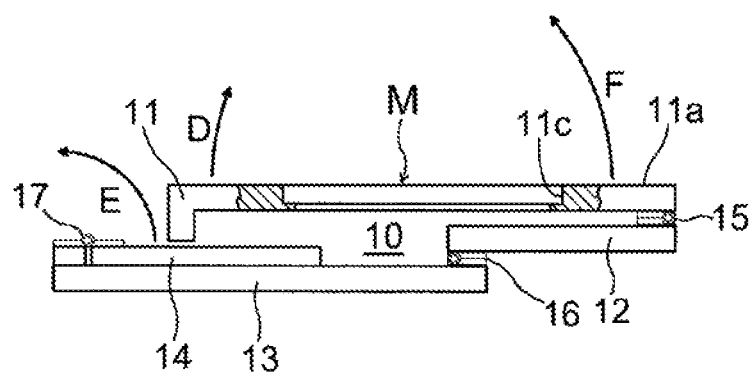

In this video picture display device case (enclosure 10), the top plate member 11 with the micromirror array M fitted therein, the first side plate member 12, the bottom plate member 13 and the second side plate member 14, all of which constitute the enclosure 10, are movably connected (hingedly connected) via hinges 15, 16 and 17. The video picture display device case may be used while allowing selection between a "usage form" and a "storage form". In the "usage form", the members 11, 12, 13 and 14 are combined together in a predetermined shape to allow the display P to be held in an inclined attitude on a display mounting surface (upper surface 14a of the second side plate member 14) provided under the micromirror array M, as shown in FIG. 8A. In the "storage form", the members 11, 12, 13 and 14 are folded and stacked so that the video picture display device case is made compact into the shape of a single plate, as shown in FIG. 8B. This is a characteristic of the video picture display device case according to the second embodiment.

The video picture display device case will be described in detail. As mentioned above, the enclosure 10 of the video picture display device case includes the top plate member 11 provided with the micromirror array M in light-transmissive fashion, the bottom plate member 13, and the first and second side plate members 12 and 14 supporting the top plate member 11 substantially horizontally in a spaced-apart relation (in space) to the bottom plate member 13. The hinges 15, 16 and 17 making the members movable are used for connection between the top plate member 11 and the first side plate member 12, between the first side plate member 12 and the bottom plate member 13, and between the bottom plate member 13 and the second side plate member 14, respectively, so that the members 11, 12, 13 and 14 are foldable in predetermined directions.

In the case of the "usage form" in which a spatial image I' is displayable, the enclosure 10 is configured such that, with the first side plate member 12 and the second side plate member 14 raised, a non-connection end portion (upper end) of the second side plate member 14 is engaged in a bent (L-shaped) end portion (non-connection end portion) of the top plate member 11, as shown in FIG. 8A. The members 11, 12, 13 and 14 are combined together to bring the enclosure 10 into an intended condition (i.e., the usage form) in which the display mounting surface 14a inclined downwardly at an angle α with respect to the lower surface Mb of the array M is located in a predetermined position under the micromirror array M.

For folding of the video picture display device case held in the usage form for the purpose of movement, carrying and the like, the hinges 15, 16 and 17 are opened and closed in the following order: A→B1 and B2→C, as indicated by the arrows in FIG. 8A, to bring the entire case into its down position. This provides the compact and space-saving "storage form" in which the members 11, 12, 13 and 14 are vertically stacked, as shown in FIG. 8B.

For the return of the video picture display device case held in the storage form to the usable (displayable) usage form, the hinges 15, 16 and 17 are opened and closed in the following order: D→E→F, as indicated by the arrows in FIG. 8B, and the non-connection end portion of the second side plate member 14 is engaged in the L-shaped end portion of the top plate member 11 in the aforementioned manner. In this manner, the change in shape (combination) between the "usage form" and the "storage form" is made by anyone easily and immediately.

Figure 14B:
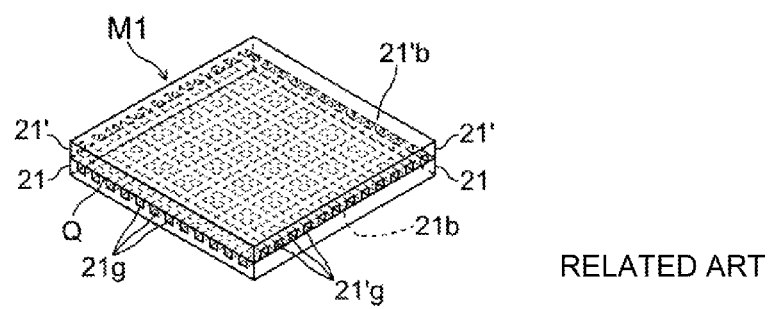
FIG. 14B is a view thereof and shows an array after assembly.

Next, examples of the image-forming optical element for use in the video picture display device case include refraction type image-forming elements such as micromirrors of a focal optical systems and corner reflectors. Of these, the micromirror array in which two optical elements having a plurality of parallel linear grooves spaced at predetermined intervals are laid one on top of the other, as shown in FIG. 14B, is preferably used in this embodiment. The micromirror array M is disposed in light-transmissive fashion in an opening 11c provided in the top plate member 11 of the enclosure 10 to be described later, and is disposed substantially horizontally as seen from the eyepoint (hollow arrow) of a viewer H, as shown in FIG. 9.

Figure 9:
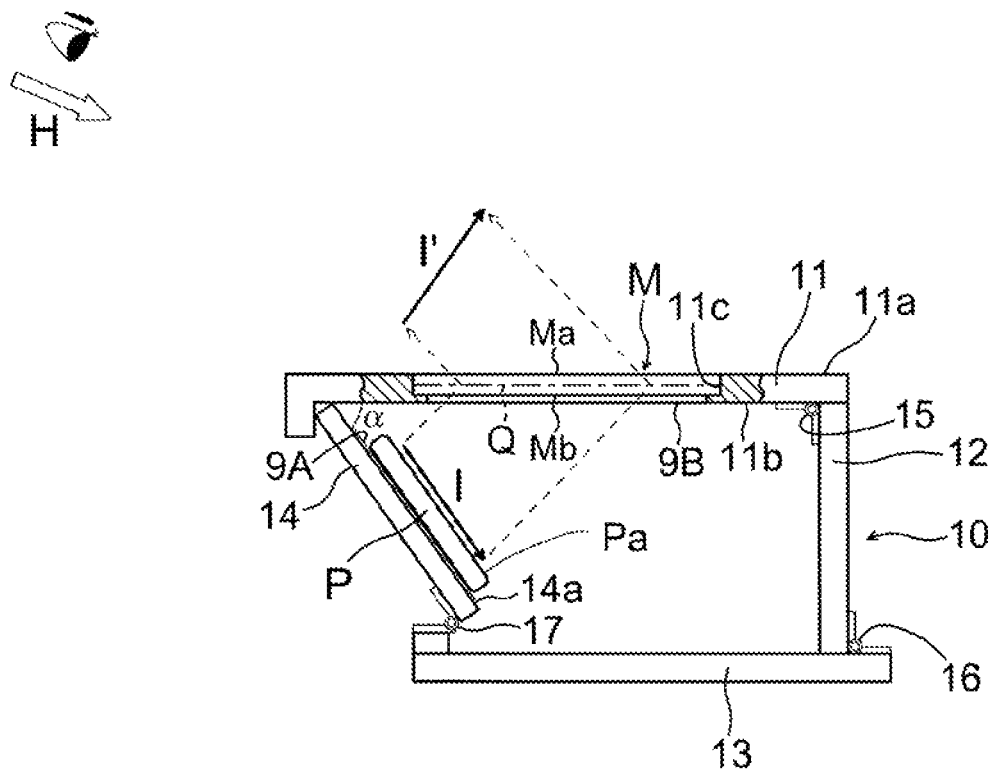
FIG. 9 is a side view illustrating a method of projecting a spatial image in the video picture display device case.

As shown in FIG. 9, the flat panel display (display P) displaying the video picture (image I) is placed on the display mounting surface (upper surface 14a of the second side plate member 14) so that the display surface Pa (image I) is inclined downwardly at a predetermined inclination angle α (in this instance, 55 degrees) with respect to the lower surface of the micromirror array M from the front side (side H) of the viewer toward the rear side of the video picture display device case. The image I appearing on the display surface Pa is projected through the micromirror array M into space lying over the micromirror array M as the spatial image I' (erect image). This spatial image I' faces toward the viewer (front side, the side H).

Examples of the display P used for displaying the image I may include display panels capable of reproducing "white" as balanced as possible over all visible wavelengths and "black" when in a non-display state with good contrast, such as plasma display panels and organic EL display panels, in addition to liquid crystal display panels (LCDs) with backlights. The display P may be a display part for a cellular mobile phone, a portable information terminal (personal digital assistant) and the like. Specifically, normally exposed (uncovered) type display parts (display surface Pa) for smartphones, tablet PCs, digital photo frames, portable game machines, portable book readers, PDAs, electronic dictionaries and the like in which the dimensions of the display surface Pa correspond to the size (planar shape) of the micromirror array M may be used as the display P.

The downward inclination angle α of the display P with respect to the micromirror array M is not less than 30 degrees and less than 90 degrees (30°≤α<90°) in consideration for the attitude, distance and the like of the viewer that uses this video picture display device case.

In the configuration of the video picture display device case of the second embodiment, the display P is placed on the display mounting surface 14a positioned under the micromirror array M so that the display surface Pa (image I) is inclined downwardly when the video picture display device case is in the usage form (FIG. 8A), whereby a two-dimensional image rich in a sense of depth and appearing three-dimensional is displayed by a simple operation. In addition, the video picture display device case is stored and carried compactly when not in use, as in the storage form (FIG. 8B). Further, when the video picture display device case is used again, the video picture display device case is returned to the usage form (FIG. 8A) by a simple assembling operation to immediately start the display (projection of the spatial image I').

Figure 10A:
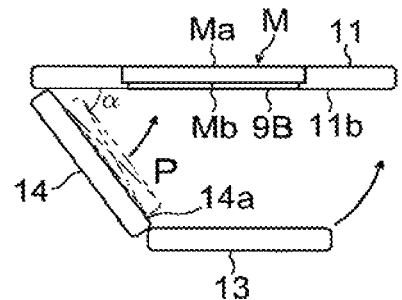
FIGS. 10A to 10D are side views of other exemplary combinations of the video picture display device case according to the second embodiment of the present invention.
Figure 10B:
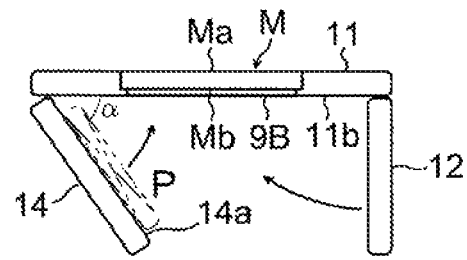

In the second embodiment, the enclosure 10 is comprised of the four plate-like members 11, 12, 13 and 14 including the bottom plate member 13 (combined together). However, the enclosure 10 may be comprised of members different in shape and in number. For example, as shown in other embodiments of FIGS. 10A to 10D, the enclosure 10 may be an enclosure (FIG. 10A) having a foldable structure with one side surface open and comprised of three members or an enclosure (FIG. 10B) having a foldable structure with a bottom surface open and comprised of three members similarly. In FIGS. 10A and 10B, hinges for connection between the members are not shown. In these cases, the upper surface 14a of the second side plate member 14 serves as the display mounting surface inclined downwardly at a predetermined angle α with respect to the lower surface Mb of the top plate member 11 (micromirror array M), as in the second embodiment.

Figure 10C:
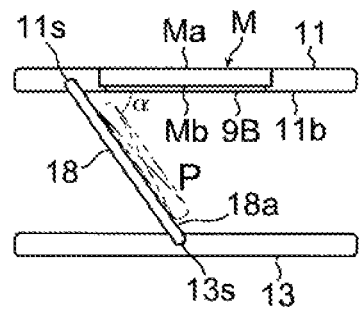

Further, the video picture display device case (enclosure) may be of an assembling type, rather than the folding type using hinges and the like. For example, as shown in FIG. 10C, the top and bottom plate members 11 and 13 having respective slits (11s and 13s) of a predetermined shape (the top plate member 11 including the micromirror array M), and a plate-like support member 18 are prepared. By inserting opposite end portions of the plate-like support member 18 into the respective slits 11s and 13s, an enclosure of an assembling type is provided. In this case, the plate-like support member 18 has an upper surface 18a serving as the display mounting surface inclined downwardly at a predetermined angle of with respect to the lower surface Mb of the top plate member 11 (micromirror array M).

Figure 10D:
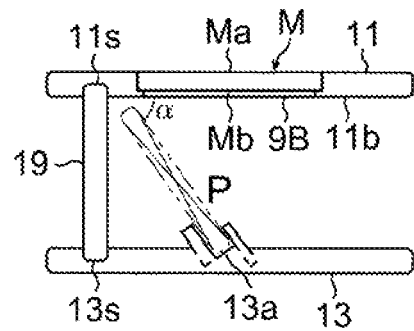

An enclosure of a similar assembling type is shown in FIG. 10D, for example. The top and bottom plate members 11 and 13 having respective slits (11s and 13s) of a predetermined shape (the top plate member 11 including the micromirror array M), and a plate-like support member 19 are prepared. By inserting opposite end portions of the plate-like support member 19 into the respective slits 11s and 13s, the enclosure of an assembling type is provided. In this case, the inner surface of the plate-like support member 19 is a vertical surface. For this reason, one end of the display P is fitted in a groove 13a provided in the upper surface of the bottom plate member 13 and having assisting plates on opposite sides, so that the display P is fixed in an attitude inclined at a predetermined angle α with respect to the lower surface Mb of the top plate member 11 (micromirror array M).

Next, a video picture display device case in a third embodiment according to a second aspect of the present invention will be described.

Figure 11A:
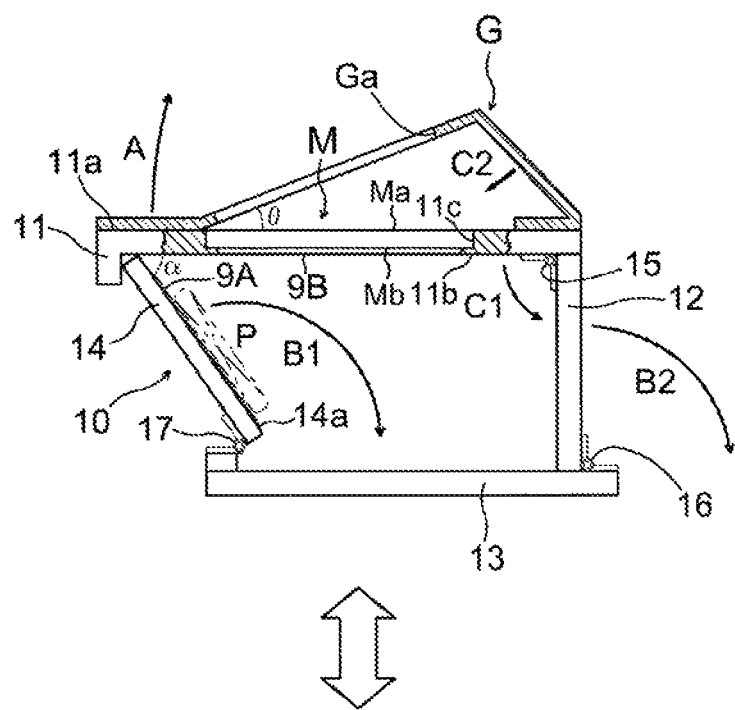
FIGS. 11A and 11B are side views illustrating the manner of transformation of the video picture display device case according to a third embodiment.
Figure 11B:
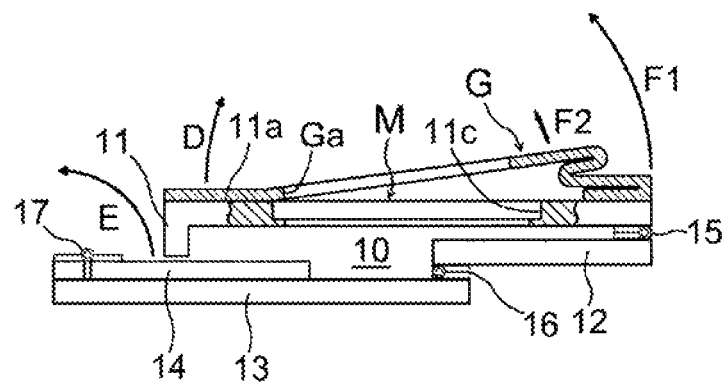
Figure 12:
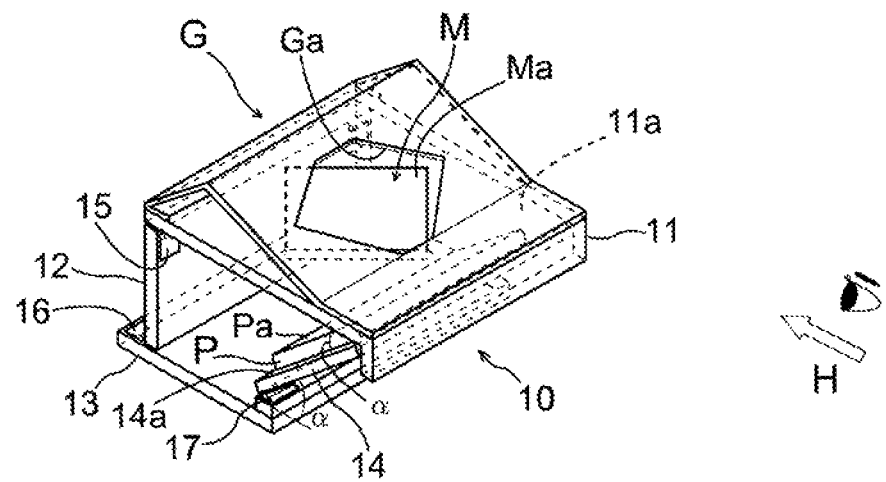
FIG. 12 is a perspective view of a configuration of the video picture display device case in the usage form according to the third embodiment.
Figure 13:
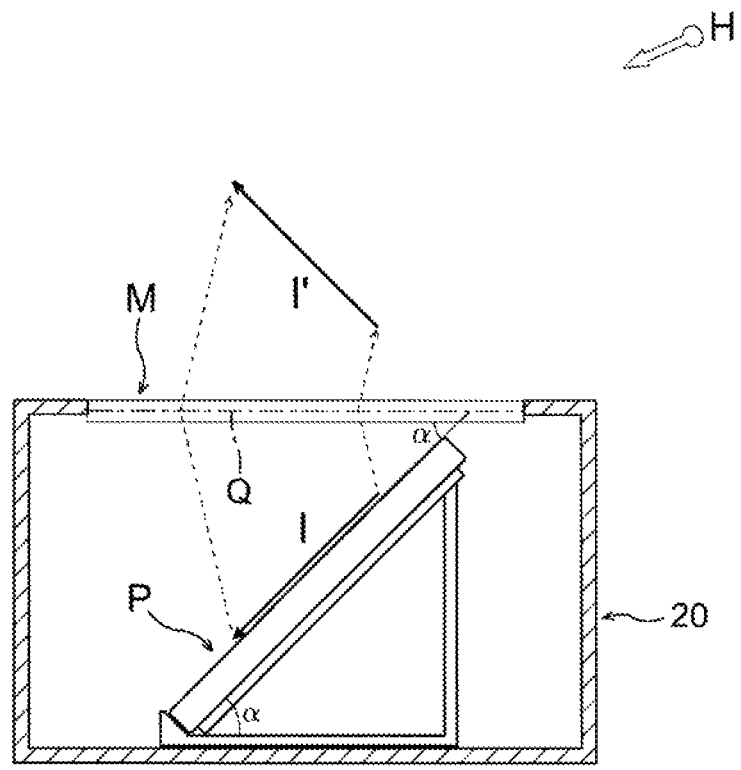
FIG. 13 is a view of a structure of a conventional video picture display device.

FIGS. 11A and 11B are side views, partially in cross-section, illustrating the manner of transformation of the video picture display device case (enclosure) according to the third embodiment of the present invention. FIG. 11A shows the shape of the enclosure in the usage form, and FIG. 11B shows the shape of the enclosure in the storage form. FIG. 12 is a view of a configuration of the video picture display device case in the usage form. In FIG. 11A, as in FIG. 8A, the display P placed on the inclined display mounting surface 14a is indicated by phantom lines (dash-double-dot lines) for the purpose of briefly illustrating only the manner of transformation of the enclosure. The structure of the enclosure 10 itself which houses the image-forming optical element (micromirror array M) and the display P therein is similar to that of the video picture display device case of the second embodiment, and will not be described in detail.

The video picture display device case of the third embodiment differs from the video picture display device case of the second embodiment in that a viewing direction guiding plate (referred to hereinafter as a guide plate G) having an opening Ga corresponding to the planar shape of the micromirror array M is disposed between the upper surface Ma of the micromirror array M and the spatial image I', the guide plate G being in an attitude inclined upwardly at a predetermined angle θ with respect to the upper surface Ma of the micromirror array M from the front side of the viewer toward the back side. In the video picture display device case of the third embodiment, light reflected from the micromirrors (corner reflectors) of the micromirror array M pass through the opening Ga of the guide plate G to form an image as the spatial image I'. This is a characteristic of the video picture display device case according to the third embodiment.

The guide plate G is formed by bending a flat member. As shown in FIG. 12, the opening Ga corresponding to the planar shape of the micromirror array M is provided substantially in the center of the guide plate G. Also, like the enclosure 10, the guide plate G is configured to be folded and transformed into the space-saving "storage form" in which the entire plate is compact and substantially plate-like, as shown in FIG. 11B.

For folding of the guide plate G for the purpose of movement, carrying and the like, the guide plate G is folded along previously formed bend lines for mountain and valley folds in the following order of arrows: C1→C2, at the same time as the enclosure 10 folded in the following order of arrows: A→B1 and B2, as shown in FIG. 11A. For the return of the guide plate G held in the storage form to the usable "usage form", the guide plate G is raised in the following order of arrows: F1→F2 at the same time that the enclosure 10 is raised in the following order of arrows: D→E, as shown in FIG. 11B, so that the guide plate G is returned to the original shape as shown in FIG. 11A.

In the video picture display device case of the third embodiment including the guide plate G and having the aforementioned configuration, the change in shape (combination) between the "usage form" and the "storage form" is made by anyone easily and immediately. Of course, the display P is placed on the display mounting surface 14a positioned under the micromirror array M so that the display surface Pa (image I) is inclined downwardly when the video picture display device case is in the usage form (FIG. 12), whereby a two-dimensional image rich in a sense of depth and appearing three-dimensional is displayed by a simple operation.

In the video picture display device case, a comparable object (guide plate G) which causes parallax from the spatial image I' is present near (around) the spatial image I' standing up obliquely. Thus, the video picture display device case improves the three-dimensional effect, the sense of floating, the sense of realism and the like of the spatial image I', as compared with cases which have no object around the spatial image. Further, a dark part (shadow) is formed (in a gap) between the guide plate G and the micromirror array M to become a background of the spatial image I', thereby enhancing contrast in video pictures, the image I and the like. This allows the viewer to feel the depth, the sense of floating, the sense of realism and the like of the spatial image I' more strongly.

Unless the viewer looks into the video picture display device case including the guide plate G in a direction and position appropriate for the viewing of the spatial image (the front of the opening of the inclined plate), the guide plate G hides part of the upper surface Ma of the image-forming optical element (micromirror array M) and the like unnaturally (unevenly) to give a feeling of strangeness to the viewer. Thus, the viewer who uses (views) this video picture display device case rotates the video picture display device case to an appropriate position and angle, for example, by lifting the video picture display device case or moves himself/herself to the front position facing the opening Ga, thereby unconsciously moving his/her eyepoint to a direction and position where the viewer can view the upper surface Ma of the micromirror array M equally on both sides through the opening Ga of the guide plate G without difficulty. Thus, the video picture display device case according to the third embodiment allows anyone to easily find the direction and position suitable for viewing where the viewer feels the three-dimensional effect and the like of the spatial image. Further, the viewing direction and position are the position where the viewer can feel the three-dimensional effect, the sense of floating, the sense of realism and the like of the spatial image strongest in the video picture display device case. This provides additional advantages.

The enclosures combined with other members as in the second embodiment as shown in FIGS. 10A to 10D may be used as the enclosure 10 (base for mounting of the guide plate G) of the video picture display device case of the third embodiment. Also, the guide plate G is disposed in an attitude inclined in the same direction as the spatial image I', i.e., inclined upwardly with respect to the micromirror array M from the front side toward the back as seen from the viewer. The direction of inclination of the guide plate G is a direction which provides a mirror image of the display P with respect to the micromirror array M, as shown in FIG. 12, as seen with reference to the display P (inclination angle α) which displays the image I. That is, the guide plate G is inclined in the same direction as the projected spatial image I', and is disposed so as to be inclined in a direction of inclination such that it is low in height on the front side of the viewer and increases in height away from the viewer toward the back side.

The inclination angle θ of the guide plate G with respect to the upper surface Ma of the micromirror array M is set at an angle not greater than the inclination angle α of the display P (display surface Pa) with respect to the micromirror array M. A relationship expressed by $$0 < \theta \leq \alpha \text{ (where } 30° \leq \alpha < 90°)$$

holds between the inclination angle α and the inclination angle θ.

Examples of the shape of the opening Ga in the guide plate G may include, in addition to the hexagonal shape as shown in FIG. 12, other polygonal shapes such as tetragonal and pentagonal shapes, and simple circular and elliptical shapes. The size (inner edge shape) of the opening Ga may be any shape that is close to the planar shape of the micromirror array M.

It is sufficient for the guide plate G to have a minimum shape and size (size of the outer edges of a frame) such that part of the outer edge of the micromirror array M is hidden behind the guide plate G as seen from the viewer. It is, however, necessary that the guide plate G covers a somewhat wide range including the upper part of the edge portion of the micromirror array M for the purpose of guiding the position of viewer's line of sight or head (eyes) to a proper position in front of the opening Ga with reliability, as mentioned above. Specifically, the size and shape of the guide plate G are determined as appropriate in accordance with the shape of the upper surface of the enclosure 10 of the video picture display device case in consideration for design, balance and the like. Preferably, the color of the upper surface of the flat part of the guide plate G except the opening Ga (background of the spatial image I') is a dark color such as black and gray or a lusterless matte color so as not to hinder the viewing of the spatial image. Patterns, recesses, protrusions and the like may be made on the surface of the aforementioned flat part so long as they do not hinder the viewing of the spatial image I'.

Although specific forms in the present invention have been described in the aforementioned example, the aforementioned example should be considered as merely illustrative and not restrictive. It is contemplated that various modifications evident to those skilled in the art could be made without departing from the scope of the present invention.

The portable information device case and the video picture display device case according to the present invention are capable of displaying a two-dimensional video picture rich in a sense of depth and appearing three-dimensional with a simple assembling operation and which are stored and carried compactly when not in use.

REFERENCE SIGNS LIST

1 Smartphone case
2 Holder part
3 Cover part
4 Optical panel part
5 and 5' Connecting members
6 and 6' Connecting members
7 Connecting member
8 Additional panel part
9A Adhesive tape
9B Acrylic board
10 Enclosure
11 Top plate member
12 First side plate member
13 Bottom plate member
14 Second side plate member
15, 16 and 17 Hinges
20 Case
21 and 21' Substrates
G Guide plate
P Display
M Micromirror array M1 Micromirror array
S Smartphone
Sa Display surface
I Image
I' Spatial image

The invention claimed is:

1. A portable information device case comprising:
a plate holder part having a recess for housing a portable information device therein so that a display surface of a display of the portable information device is visible;
a cover part for covering the display surface of the display, with a gap created therebetween; and
an optical panel part including an image-forming optical element fitted therein in light-transmissive fashion,
wherein, in a first form in which the holder part, the cover part and the optical panel part are combined together to have the shape of a polygonal tube, the image-forming optical element fitted in the optical panel part is held in an attitude inclined at a predetermined angle with respect to the display surface of the display in opposed relation thereto, so that a video picture on the display surface of the display transmitted through the image-forming optical element is image-formed outside the image-forming optical element in a manner which appears to float from a viewpoint of an observer.

2. The portable information device case according to claim 1,
wherein selection is allowed between (i) the first form in which a hinge connection is made between the holder part and the cover part and a hinge connection is made between the optical panel part and one of the holder part and the cover part, so that the holder part, the cover part and the optical panel part are assembled into the shape of the polygonal tube and (ii) a second form in which the holder part, the cover part and the optical panel part are folded by closing the hinge connections, so that the optical panel part is housed between the holder part and the cover part.

3. The portable information device case according to claim 1,
wherein the inclination angle of the image-forming optical element with respect to the display surface of the display is not less than 30 degrees and less than 90 degrees when the case is in the first form.

4. The portable information device case according to claim 1, wherein the recess of the holder part is a recess for housing a smartphone therein.

5. The portable information device case according to claim 1, wherein the recess of the holder part is a recess for housing a slate-type or tablet-type information terminal therein.

6. A video picture display device case comprising:
an enclosure for housing a display therein; and
an image-forming optical element,
the enclosure including a top plate member provided with the image-forming optical element, and at least two side plate members each having an upper part supporting the top plate member,
wherein, when the case is in a usage form in which the top plate member and the two side plate members are combined together to have a predetermined shape, the image-forming optical element is disposed in the upper surface of the top plate member of the enclosure, a display mounting surface that is an inner surface of the side plate members is provided under the image-forming optical element, and the display is held on the display mounting surface, with a display surface of the display held in an attitude inclined at a predetermined angle with respect to the lower surface of the image-forming optical element, so that a video picture on the display surface of the display transmitted through the image-forming optical element is image-formed over the image-forming optical element in a manner floating up.

7. The video picture display device case according to claim 6,
wherein selection is allowed between (i) the usage form in which a hinge connection is made between the top plate member and at least one of the side plate members, so that the top plate member and the two side plate members are combined together to be able to project a video picture and (ii) a storage form in which these members are individually separated or folded and stacked, so that the shape of the entire video picture display device case is made compact relative to the usage form.

8. The video picture display device case according to claim 6,
wherein the inclination angle of the display surface of the display with respect to the lower surface of the image-forming optical element is not less than 30 degrees and less than 90 degrees when the cased is in the usage form.

* * * * *